(12) United States Patent
Farhan

(10) Patent No.: US 6,822,972 B1
(45) Date of Patent: Nov. 23, 2004

(54) BIDIRECTIONAL COMMUNICATION SYSTEM WITH RING CONFIGURATION

(75) Inventor: Forrest M. Farhan, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 723 days.

(21) Appl. No.: 09/659,276

(22) Filed: Sep. 12, 2000

(51) Int. Cl.[7] .................. H04L 12/26; H04L 12/28; H04B 10/12; H04J 14/02
(52) U.S. Cl. .................. 370/487; 370/216; 370/255; 370/404; 398/59; 398/82; 359/337
(58) Field of Search ............... 370/216, 222, 370/223, 224, 228, 227, 395, 431, 487, 468; 359/115, 118, 125, 137, 154, 167, 337; 398/2, 3, 59, 79, 82; 714/4, 716

(56) References Cited

U.S. PATENT DOCUMENTS

| | | | |
|---|---|---|---|
| 4,763,317 A | 8/1988 | Lehman et al. | 370/58 |
| 5,159,595 A * | 10/1992 | Flanagan et al. | 370/85 |
| 5,544,161 A | 8/1996 | Bigham et al. | 370/58.1 |
| 5,572,526 A * | 11/1996 | Cidon et al. | 370/85 |
| 5,644,622 A | 7/1997 | Russell et al. | 455/422 |
| 5,790,523 A | 8/1998 | Ritchie, Jr. et al. | 370/241 |
| 5,790,533 A | 8/1998 | Burke et al. | 370/318 |
| 5,878,325 A | 3/1999 | Dail | 455/5.1 |
| 5,917,822 A * | 6/1999 | Lyles et al. | 370/395 |
| 5,966,636 A | 10/1999 | Corrigan et al. | 455/4.2 |
| 6,041,056 A | 3/2000 | Bigham et al. | 370/395 |
| 6,097,533 A * | 8/2000 | Atlas | 359/337 |
| 6,161,011 A | 12/2000 | Loveless | 455/426 |
| 6,223,225 B1 * | 4/2001 | Bisdikian et al. | 709/237 |
| 6,323,793 B1 | 11/2001 | Howald et al. | 341/137 |
| 6,385,366 B1 * | 5/2002 | Kin | 385/24 |
| 6,389,030 B1 * | 5/2002 | Coden | 370/404 |
| 6,462,851 B1 * | 10/2002 | West, Jr. | 359/173 |
| 6,539,144 B1 * | 3/2003 | Lu | 385/24 |
| 6,577,414 B1 * | 6/2003 | Feldman et al. | 3569/125 |
| 6,615,362 B1 * | 9/2003 | Daruwalla et al. | 714/4 |
| 6,626,590 B1 * | 9/2003 | Nagatsu et al. | 398/59 |

FOREIGN PATENT DOCUMENTS

EP 0 318 331 5/1989

* cited by examiner

Primary Examiner—Man Phan

(57) ABSTRACT

A broadband communication system includes headend equipment for transmitting downstream signals and for processing upstream signals and communication devices coupled to one another in a bi-directional ring, where one of the communication devices functions as a hub that is coupled to the headend equipment for providing the upstream signals to, and receiving the downstream signals from, the headend equipment. A clockwise communication path couples the communication devices to one another for the reception and transmission of clockwise-traveling signals that include the downstream signals and at least a portion of the upstream signals, and a counterclockwise communication path couples the communication devices to one another for the reception and transmission of counterclockwise-traveling signals that include the downstream signals and at least a portion of the upstream signals. The system also includes subscriber equipment coupled to the communication devices for receiving the downstream signals and for generating the upstream signals. When a malfunction is detected in one of the communication paths, the functioning path is then employed to transmit the downstream signals to the communication devices that are no longer able to receive the downstream signals via the malfunctioning path.

13 Claims, 9 Drawing Sheets

BIDIRECTIONAL COMMUNICATION SYSTEM WITH RING CONFIGURATION

FIELD OF THE INVENTION

This invention relates generally to fiber optic communications and, more specifically, to systems and methods for the distribution of signals in a cable television system.

BACKGROUND OF THE INVENTION

Modern cable television (CATV) distribution systems deliver video programming signals to a large number of subscribers and may additionally provide for the bidirectional transport of digital data (e.g., Internet service), on-demand programming requests (e.g., pay-per-view programming), and voice telephony signals.

A typical CATV system has a headend station that receives satellite signals and converts them to baseband. The headend station may also transmit and receive signals from terrestrially-based communication networks, including the Internet and public switched telephone network (PSTN). Signals received by the headend are combined according to established conventions and optically transmitted to downstream stations using fiber optic cable. Primary and secondary hubs receive the headend optical transmission and amplify it for distribution to nodal stations (nodes) within the CATV distribution plant. Optical signals received by the nodes are converted to radio frequency (RF) electrical signals and transmitted along branches of the system using coaxial cable. Amplifiers, splitters, and taps are typically used to route the RF signals to individual system subscribers.

Bidirectional information flow is achieved by including suitable receivers and transmitters throughout the distribution plant. The receivers and transmitters are designed to transport signals from subscriber equipment, such as modems and set-top boxes, to the headend in the reverse, or upstream, direction. Starting as an RF signal in the 5 MHz –40 MHz band, subscriber-generated information is transmitted to the nodes using coaxial cable. Electrical signals received by the node are converted to optical signals that are transported to the hubs and headend over fiber optic cable.

Known as a hybrid fiber coax (HFC) system, the architecture described above is an industry standard. Combining the low cost and ease of installation of conventional RF cable with the high bandwidth capabilities of optic fiber, these networks can efficiently distribute headend-transmitted digital and analog television signals to a large subscriber base. In conventional systems, signal transport in the reverse direction is complicated by the fact that upstream noise from a large number of sources is combined at the nodes and funneled into hubs and the headend receiver. Electronic interference (ingress) may enter the system at each subscriber location. This interference may be due, at least in part, to leaky connectors. The ingress noise is summed at the nodes and added to distortion in the fiber optic plant, which may be present as a result of diode clipping and intermodulation.

Regardless of signal modulation format, the number of subscribers connected to a single node (referred to as the depth of the fiber in the system) is a major determinant of the noise signal received by a node. Since each item of subscriber equipment can be a source of ingress, the total noise received increases with the number of potential subscribers (e.g., homes passed) that the system serves. Conventional HFC systems have node sizes of 600 to 1200 homes passed and incorporate several RF amplifiers in the coaxial network connecting individual subscribers to a node. Fiber deep architectures offer improved performance by decreasing the number of potential subscribers connected to each node and eliminating the RF amplifiers in the coaxial plant. Optionally, the fiber deep nodes may contain processors for resolving media access control issues.

Fiber deep node reverse plant architectures may utilize multiplexing nodes to combine the signals from several nodes before transmitting the signals to a hub. Alternatively, the nodes may be connected, one to another, with one end of the network connected to a hub in a daisy-chained fashion. The AT&T Lightwire II system, for example, employs two-way digital baseband communication network in which several 'mini fiber nodes', or mFNs, are connected in a daisy chain architecture. Attractive features of this system include ease of expansion and the improved fidelity of digital transmission.

Unfortunately, this prior art architecture has no provision for electronic fault location from the headend station. Therefore, a break in the upstream portion of a string of daisy-chained nodes will disconnect the downstream portion of the chain from the system. Thus, what is needed is an improved system architecture that allows for electronic fault location from the hub or headend station.

DETAILED DESCRIPTION OF A PREFERRED EMBODIMENT

Modern broadband communication systems, such as cable television (CATV) distribution systems, are often two-way communication systems that allow a central station to communicate with a large number of subscriber devices. Information flow within the system is typically assymetric, with the largest percentage of the available bandwidth being used for the distribution of television signals from the headend station. Two-way Internet communications, voice telephony, data communications, and requests for special programming require a smaller slice of the available spectrum. For example, current CATV distribution systems utilize the frequency band from about 5 MHz to 40 MHz for subscriber-to-headend (e.g., reverse or upstream) information transfer and reserve the frequency band from about 50 MHz to 750 MHz for headend-originated signals (e.g., forward or upstream signals).

Early in the history of CATV systems, fiber optic cables were used to transport information from the headend station to downstream stations that received the optical signals and converted them to radio frequency (RF) electronic signals. Known as nodes, these stations were connected to individual subscriber locations by a network of coaxial cables, RF amplifiers, and taps. In response to requirements for increased bandwidth, two-way communications, and redundancy, these systems evolved into today's hybrid fiber coax (HFC) distribution systems.

Figure 1:
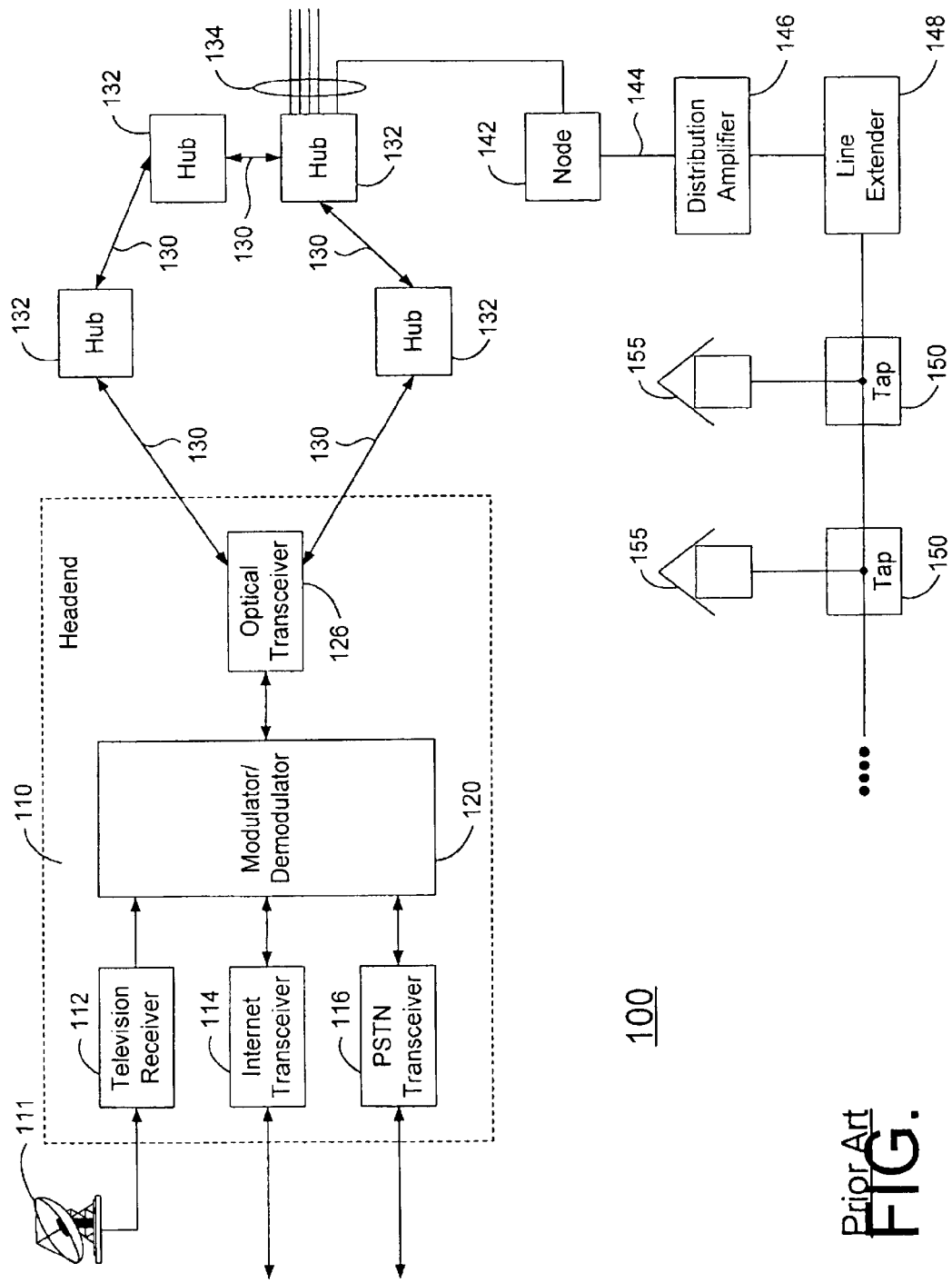
FIG. 1 is a schematic block diagram of a prior art HFC CATV distribution plant.

Shown schematically in FIG. 1, a typical HFC cable television distribution system 100 includes a headend station 110 that receives program information from satellite stations 111 and converts the information to intermediate frequency (IF) signals using one or more receivers 112. Optionally, a digital transceiver 114 and/or telephony transceiver 116 may provide bidirectional links between the headend station 110 and terrestrial systems. In current practice, the digital transceiver 114 is typically connected to the Internet, and the telephony unit 116 communicates with a public switched telephone network (PSTN). In each case, these units 114, 116 transfer electronic signals at an intermediate frequency to a modulator/demodulator unit 120. The modulator filters and combines the forward-travelling RF signals in a manner suitable for transmission by the optical transceiver 126. Optical information signals are carried by optical fibers 130 to a network of hubs 132 that monitor the status of the distribution plant and distribute the optical information signal to nodes 142 along optical cables 134. The nodes 142 convert the optical signal to RF electronic signals. These RF signals are distributed to subscriber equipment 155 by RF branches that may include a coaxial transmission line 144, a distribution amplifier 146, a line extender 148, and taps 150 that connect the individual subscriber locations to the system.

In the reverse direction, subscriber equipment may generate information such as special programming requests, Internet communications, local area network communications, data signals, and voice telephony. The subscriber information is transmitted in the reverse direction through the coaxial portion of the HFC plant to the fiber optic node 142. At the node 142, the subscriber information is converted from electrical signals to a form suitable for optical transmission and sent, via a laser transmitter included within the node 142, to a hub 132. The reverse optical signal, which includes subscriber information from a variety of subscriber devices, is then transmitted on the high speed fiber optic bus 130 to the headend transceiver 126. The transceiver 126 converts the optically-transmitted information to an electronic signal that can be processed by the demodulator 120, which identifies, splits and reformats appropriate portions of the return signal for subsequent processing by the transceivers 112, 114, 116.

Conventionally, optical transceivers that are located throughout the optical portion of an HFC plant transport information using an analog modulation format that has a number of drawbacks. Specifically, nonlinearities in the fiber optic cable can degrade signal quality over distance. Furthermore, analog modulation schemes are highly sensitive to variations in the input signal level and the electro-optical properties of the transmitting laser. For example, nonlinearities in the optical signal may be caused by temperature fluctuations and/or changes of the electrical characteristics of the laser diode junction with environment and time. These problems may be minimized by using an architecture in which information is transmitted in an on/off keyed digital format.

Reverse communication is further complicated by the fact that noise from many downstream sources is combined at the nodes and hubs and funneled into the headend receiver. There is also a potential for access conflicts since it is likely that more than one subscriber device will attempt to transmit information to the headend at the same time.

The severity of these problems can be decreased by reducing the number of subscribers served by a single node. In the system of FIG. 1, for example, nodes are typically designed to serve between 600 and 1200 potential subscribers, e.g., 600–1200 homes passed. Multiple RF amplifiers are required on each nodal transmission line in order to reach this many locations. In an alternative fiber deep node architecture, individual nodes serve fewer potential subscribers, such as 70 homes passed, and RF amplifiers are not necessary in the coaxial plant.

Figure 2:
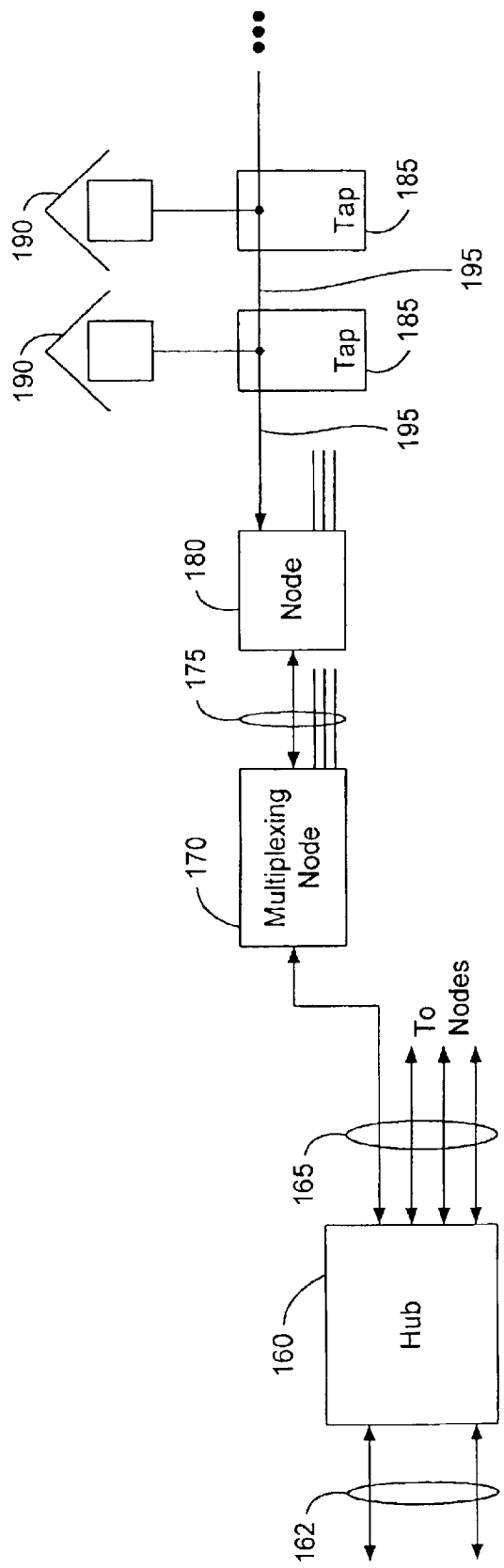
FIG. 2 is a schematic block diagram of the hub and nodes of a prior art fiber deep node CATV distribution system with multiplexing nodes.

FIG. 2 illustrates a fiber deep node system in which a hub 160 is connected to other hubs and a headend station by a high speed bus 162 in the conventional manner of FIG. 1. On the downstream side, optical fiber cables 165 carry signals to and from multiplexing nodes 170. The multiplexing nodes 170 distribute signals transmitted by the hub 160 to fiber deep nodes 180 on fiber optic cables 175. In the reverse direction, the multiplexing nodes 170 combine the optical signals that are transmitted by the fiber deep nodes 180 and retransmit the combined optical signals to the headend station (not shown). Subscriber devices 190 are connected to the node 180 via taps 185 and coaxial cable 195.

When compared to the conventional architecture of FIG. 1, the fiber deep node distribution system of FIG. 2 brings high bandwidth fiber optic cable closer to the subscriber and deeper into the distribution system. This eliminates the need for RF amplifiers in the distribution system and, in principle, reduces the amount of RF noise received by the node 180. With fewer subscribers per node, the likelihood of access conflicts for Internet other two-way services is also minimized.

Figure 3:
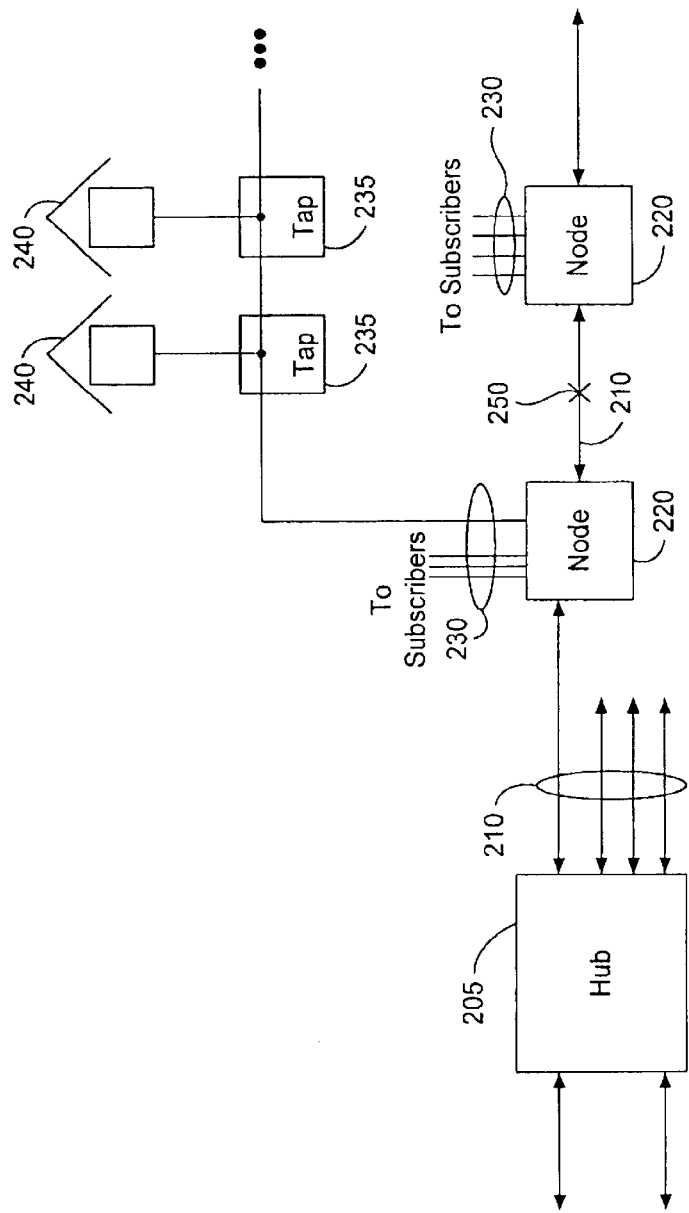
FIG. 3 is a schematic block diagram of the hub and nodes of a prior art fiber deep node CATV distribution system based on a daisy chain architecture.

FIG. 3 is an electrical block diagram of another conventional distribution system in which multiplexing nodes have been eliminated entirely. In this system, fiber deep nodes 220 are connected directly to a secondary hub 205 and to each other by fiber optic cables 210. In this system, the nodes 220 are daisy-chained together, much like a string of lights connected in series. RF cables 230 and taps 235 connect subscriber devices 240 to the node 220 in a conventional fashion. Program information from the hub 205 is transmitted to the subscriber devices 240 using conventional analog transmission techniques, while on/off keying is utilized in the reverse direction.

A major disadvantage of the prior art systems of FIGS. 2 and 3 is that a fiber break or equipment failure near the hub affects a relatively large number of customers. In the system of FIG. 3, for example, a break in the fiber optic cable at an upstream point 250 results in the interruption of service to all the subscribers located downstream from that point. The effect of nodal equipment failure is similar, although the use of redundant components (transmitters and receivers, for example) in the nodal stations can minimize this problem.

Figure 4:
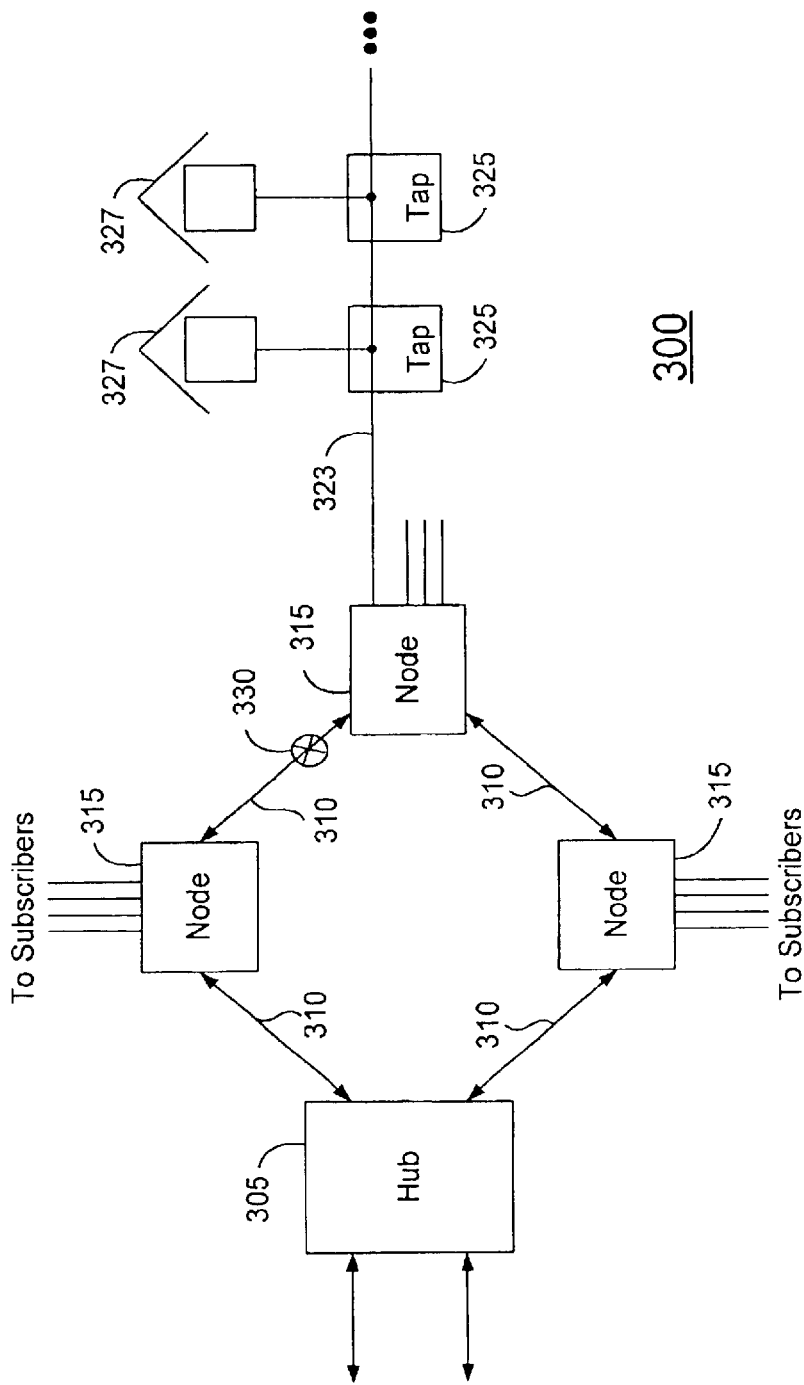
FIG. 4 is a schematic block diagram of the hub and nodes of a fiber deep node broadband communication system incorporating a bidirectional ring architecture in accordance with the present invention.

FIG. 4 shows a broadband access system 300 in accordance with the present invention. This system configuration advantageously reduces the number of subscribers affected by a fiber cable break or nodal equipment failure by connecting the fiber deep nodes 315 in a ring geometry. In this architecture, the secondary hub 305 is connected to the fiber deep nodes 315 by a closed system of fiber optic cables 310. Subscriber devices 327 are coupled to the remainder of the system by RF cables 323 and taps 325.

In contrast to the daisy-chained system of FIG. 2, the improved ring architecture is designed to support the flow of data in both clockwise and counterclockwise directions. In the event of a cable break at a point 330, for example, the nodes 315 located on both sides of the break would communicate with the hub 305 in different directions and service to the subscribers would not be interrupted. Furthermore, a nodal equipment failure would only affect the subscribers connected to the failed node. In the forward direction, signals from the headend are received by the hub 305 and transmitted in both clockwise and counterclockwise directions. Under normal operating conditions, receivers at each node 315 receive the redundant signals and select one or the other for transmission to the subscriber devices 327 over coaxial cable. In the event of a break or nodal equipment malfunction, nodes on one side of the fault would receive and transmit information from the clockwise-travelling signal, while nodes on the other side would relay the counterclockwise signal.

Figure 5:
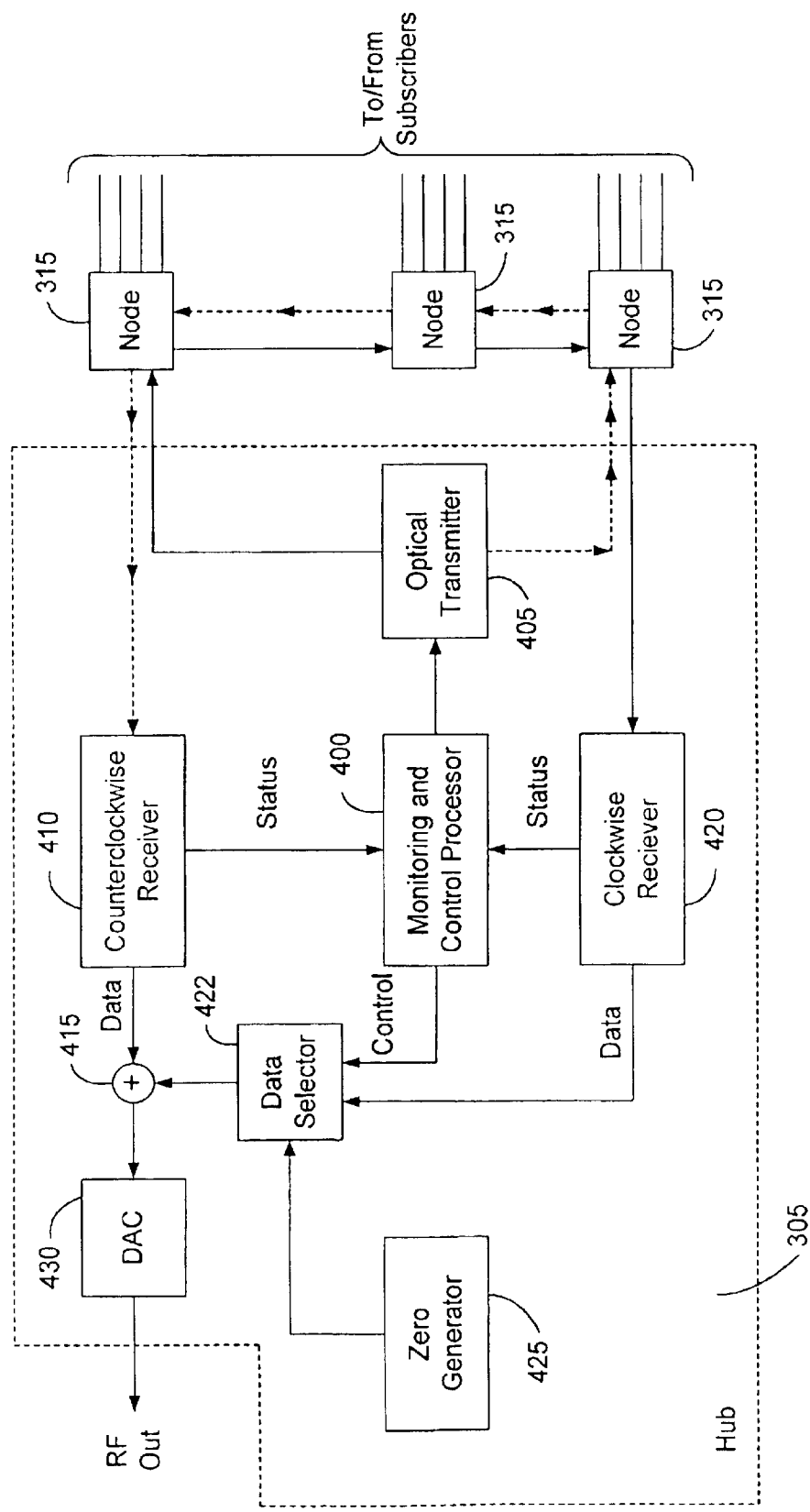
FIG. 5 is a block diagram detailing the component assemblies of a hub in the broadband communication system of FIG. 4 in accordance with the present invention.

FIG. 5 is block diagram detailing the component assemblies of the reverse path in a hub 350 according to the present fiber deep ring invention. Broken line data paths show counterclockwise information flow while information flow in the clockwise direction is indicated by solid lines. Data is typically transmitted in both directions in a digital format such as digital on/off keying, which is taught in U.S. patent application Ser. No. 09/102,344 to Farhan et al. (Farhan). The teachings of Farhan are hereby incorporated by reference.

The nodes 315 are interconnected by fiber optical cables to form a closed ring, and information transmitted to and received from subscriber devices is provided over coaxial cables in the form of RF signals. At the hub 305, a monitoring and control processor 400 receives system status information from the nodes 315 and generates control signals that adjust the nodal operating parameters. These control signals are transmitted by the optical transmitter 405 over both the clockwise fiber cable and the counterclockwise fiber cable.

At each node 315, status information and subscriber-generated signals, which may include voice telephony, digital data (e.g., Internet communications), and programming requests (e.g., pay-per-view), are added to the data streams. The counterclockwise data stream transmitted by the last node in the ring is carried to the hub 305, where it is converted into a digital electronic signal by the counterclockwise optical receiver 410. The subscriber-generated portion of the incoming signal is sent to the digital summer 415, and the system status information is routed to the monitoring and control processor 400. In similar manner, clockwise travelling information is transmitted to the hub 305 and converted to an electronic signal by the clockwise optical receiver 420. Subscriber-generated data is routed to a data selector 422, and nodal status information is sent to the monitoring and control processor 400.

During normal operation, the output of the zero generator 425 is sent by the data selector 422 to the summer 415, which causes subscriber data travelling around the ring in a counterclockwise direction to be routed, without change, to a digital-to-analog converter (DAC) 430.

When a break or equipment malfunction occurs in the counterclockwise path, the counterclockwise flow of information around the ring may be interrupted. A loss-of-signal message is then transmitted by the upstream node nearest the fault in the counterclockwise upstream direction. This message specifies the location of the problem, e.g., in the fiber link or nodal station immediately downstream from that station, and indicates that the output of the clockwise receiver 420 should be summed with the counterclockwise data. Upon receiving a loss-of-signal message, the monitoring and control processor 400 sends a control signal to instruct the data selector 422 to connect the clockwise data, rather than the output of the zero generator 425, to the summer 415. As a result, the reverse signal transmitted by nodes that are upstream from the communication break flow around the ring in a counterclockwise direction to the DAC 430, while data generated by the downstream nodes travels in the opposite direction.

Figure 6:
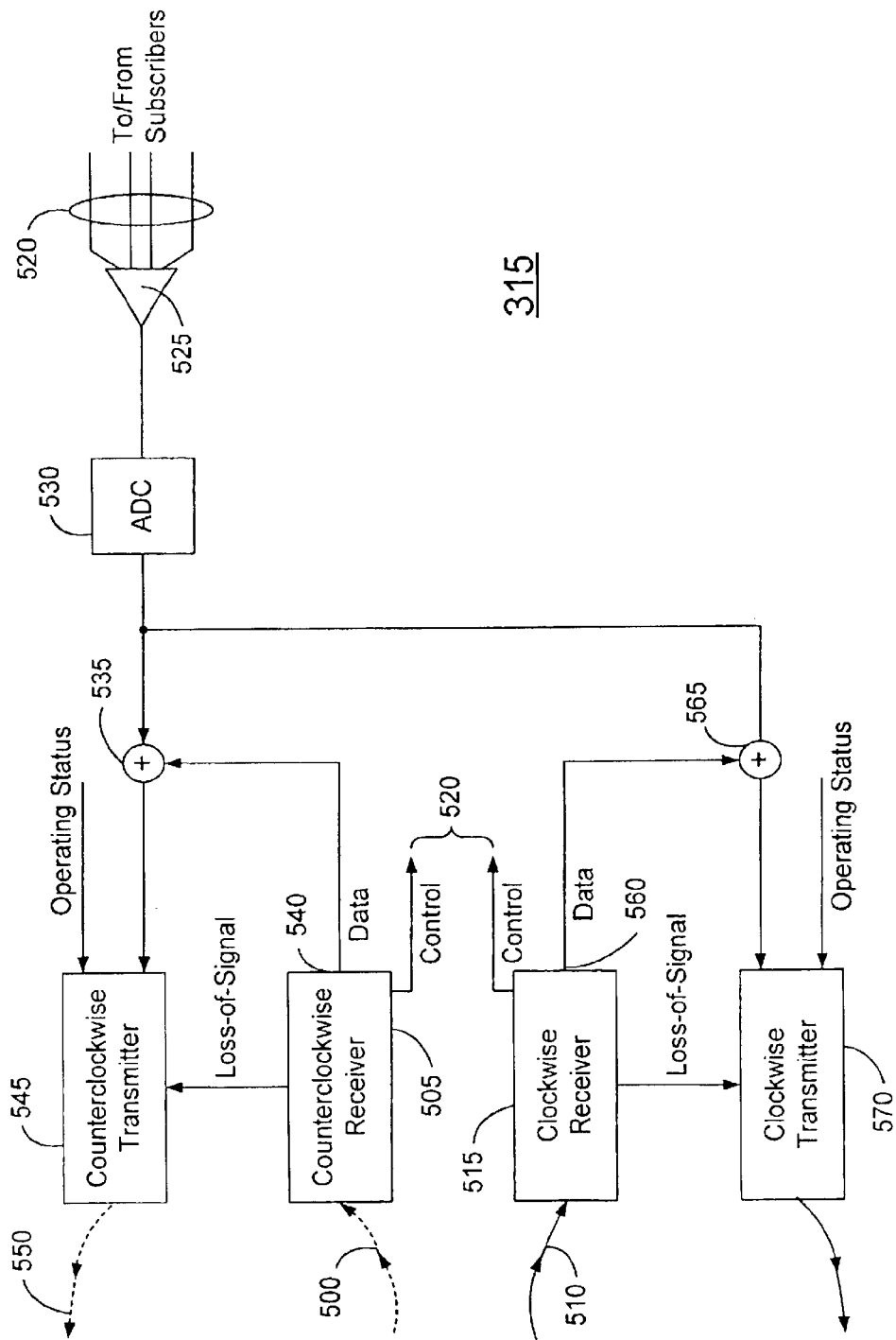
FIG. 6 is a block diagram detailing the component assemblies of a node in the broadband communication system of FIG. 4 in accordance with the present invention.

FIG. 6 is an electrical block diagram of a node 315 in accordance with the present invention. As shown, the counterclockwise digital signal from the fiber deep ring is transmitted to the node 315 on a fiber cable 500, then converted to an electronic signal by the counterclockwise receiver 505. Likewise, the clockwise signal from the fiber ring is transmitted to the node 315 via fiber 510 for processing by the clockwise receiver 515. Control signals 520 are forwarded by the receivers 505, 515 to appropriate hardware and/or software assemblies within the node 315.

RF signals from subscriber devices (not shown) are transmitted to the node 315 by coaxial cables 520 and combined by the RF summing amplifier 525. The RF output of this amplifier 525 is digitized by the analog-to-digital converter (ADC) 530 and transmitted to the digital summer 535. The summer 535 combines the reverse subscriber information with the data output 540 of the counterclockwise receiver 505 by performing digital summation, which can, for instance, be done on a per sample basis. The summed signal is provided to an input of the counterclockwise transmitter 545. In addition, status signals from component subassemblies within the node 315 are input directly to the counterclockwise transmitter 545 on a status input line. The combined data/status signal is transmitted along the fiber optic cable 550 to the next node (not shown) in the fiber ring.

In the clockwise direction, optical signals transmitted over the fiber cable 510 are received by the clockwise receiver 515, which converts the optical signal to an electrical signals. System status information is then sent to subassemblies on the control line 520. Data, provided at the data output port 560, is provided to a digital summer 565. The digital summer 565 also receives subscriber information from the ADC 530, and the combined information is provided to the clockwise transmitter 570. The summer output drives the clockwise optical transmitter 570, the output of which is connected to the next node in the ring by the fiber optic cable 575.

Figure 7:
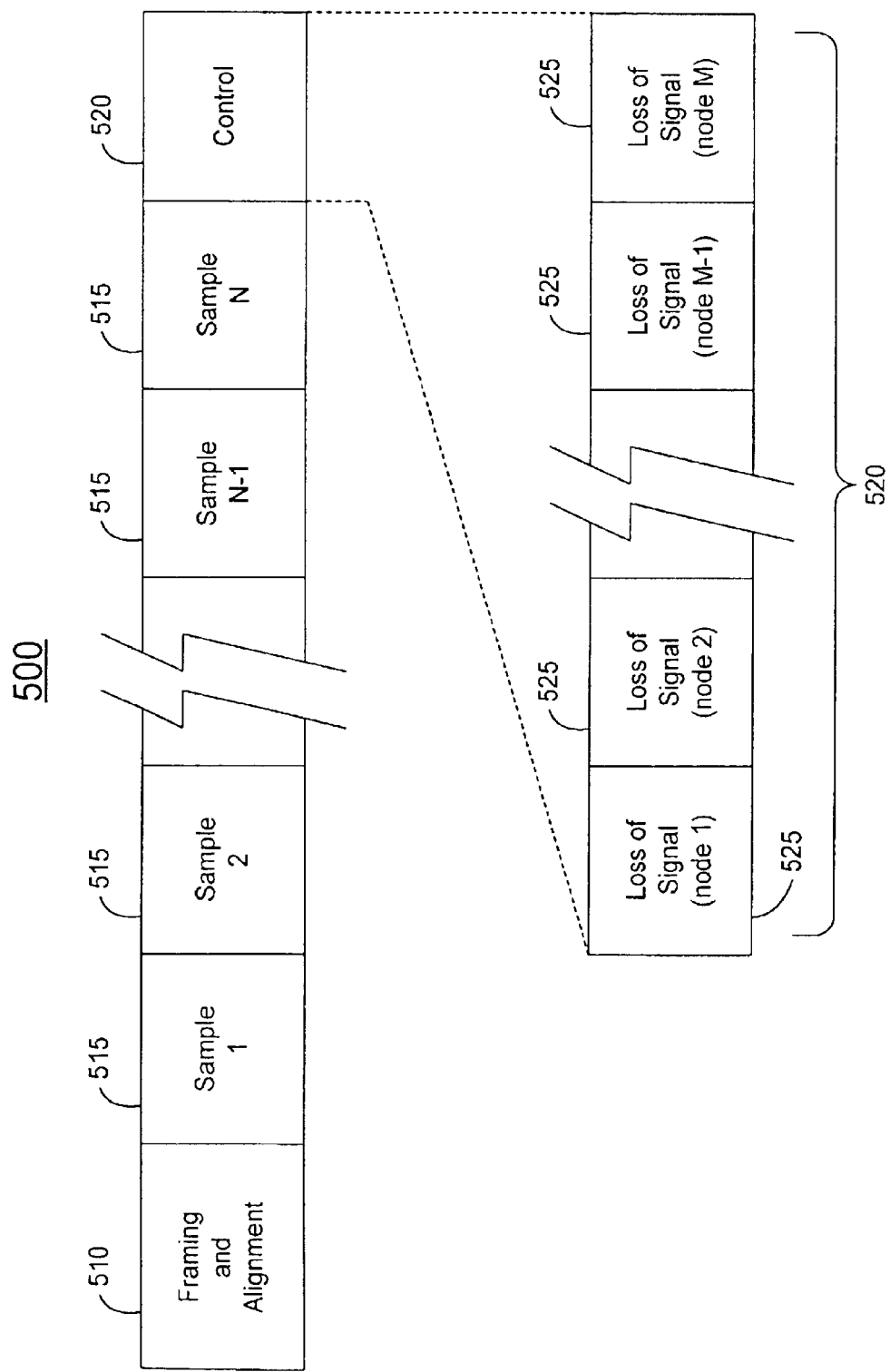
FIG. 7 is a diagram showing the format of a typical data block transmitted by a node in the broadband communication system of FIG. 4 in accordance with the present invention.

FIG. 7 is a signal diagram illustrating an example of a signal format in which data can be transported around the ring in both the forward and reverse directions in accordance with the present invention. In a data block 500, the information is divided into N+2 words, where N is an integer. At the beginning of a block, a conventional framing and alignment word 510 provides the information needed by a node or hub receiver to decode the rest of the data in the block. The N sample blocks 515 contain subscriber-generated information in addition to information on system status and nodal operating parameters. The final word of the block is a control word 520 that contains the system fault data required by the hub 305. The values of individual bits 525 within the control word 520 indicate whether a particular node 315 in the fiber deep node ring is receiving data from the previous node along the counterclockwise information path. For example, in the normal state, each bit in the control word 520 may be set to a logical zero to indicate that no faults have occurred. If a particular node 315 fails to receive a counterclockwise signal, the state of the control word bit assigned to that node 315 would be changed, i.e., a logical '1' would instead be transmitted. Upon receipt of a logical '1' anywhere in the control word 520, the monitoring and control processor 400 (FIG. 5) at the hub 305 changes the state of the data selector 422, and the clockwise-travelling data is added to the counterclockwise information signal.

While control words may optionally be included in both the clockwise and counterclockwise information signals, the system will operate correctly as long control words are included in the data blocks that travel in the normal (non-fault) direction of information flow. Since each digit of the control word corresponds to a particular node, the specific digit that is changed to the 'loss-of-signal' state allows the hub system status processor 400 to immediately determine the fault location. If control words are transmitted in both directions, it is possible to differentiate between a fiber break and a nodal equipment failure, while a unidirectional system isolates the fault to the fiber cable and node immediately preceding the node that did not receive a signal and that has therefore provided the loss-of-signal state change.

In order to improve the performance of the system, optional features may be added to the basic configuration described above. For example, it is often necessary to expand an existing system to serve new subscribers. In the forward direction, this is easily accomplished at a fiber deep node by amplifying and splitting the RF output. In the reverse direction, expansion is more difficult since noise and media access issues place an upper limit on the number of subscriber-generated inputs that may be processed by a particular node.

Figure 8:
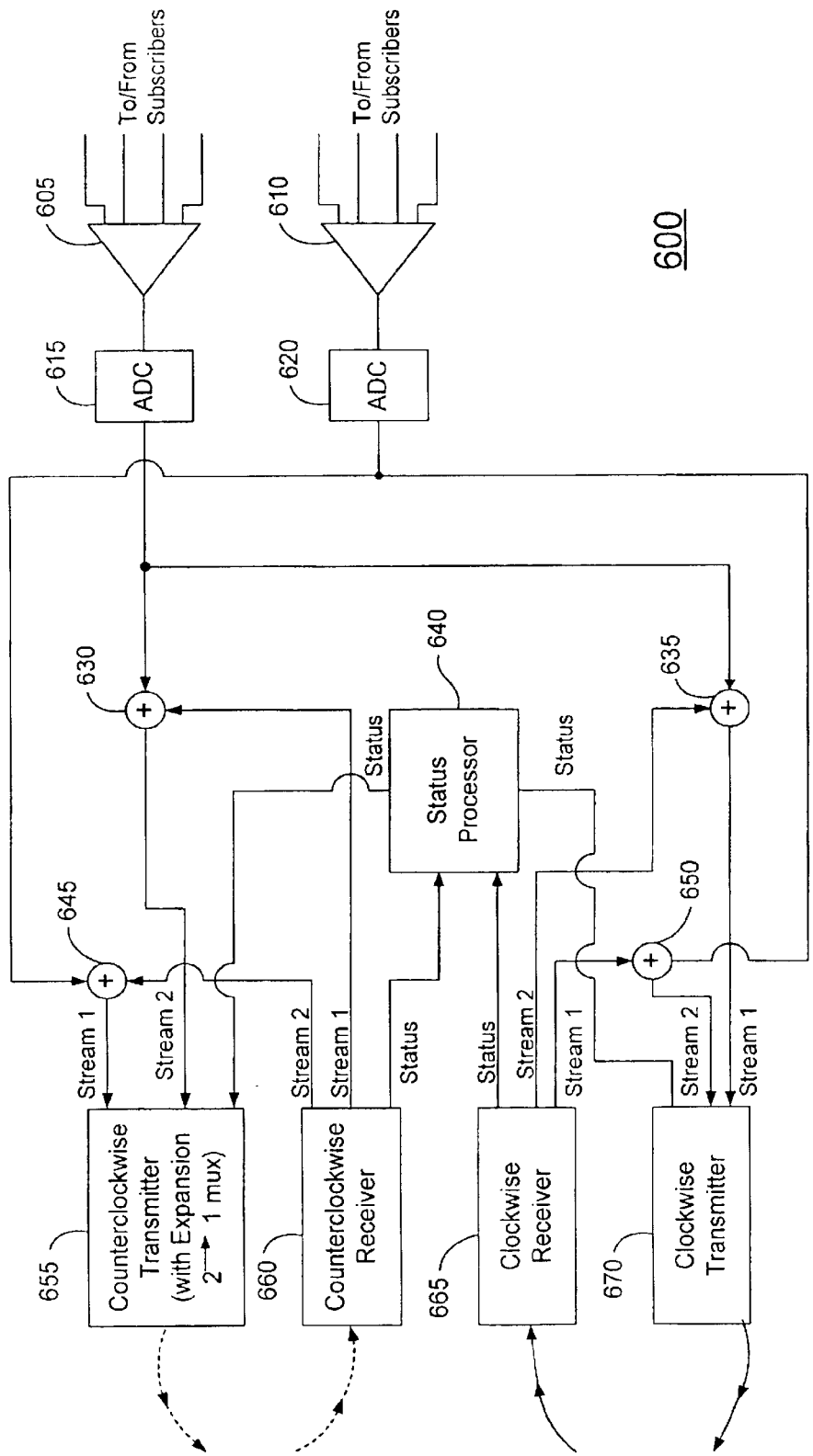
FIG. 8 is a block diagram of the component assemblies of a bidirectional fiber deep node incorporating a digital multiplexer in accordance with the present invention.

FIG. 8 depicts an alternative embodiment of a node 600 that includes optional features for improving system performance. The node 600 doubles the number of customers that are served, in comparison with the node 315 of FIG. 6, by adding an additional RF summing amplifier, an additional ADC, an additional digital summer, and a status processor for controlling the operation of key subassemblies within the node 600.

More specifically, the node 600 includes first and second RF summing amplifiers 605, 610 for transmitting signals to and receiving signals from a relatively large number of subscriber devices via RF communication channels. Signals that are combined by summing amplifier 605 are provided to a first ADC 615 for digitizing the combined signal, and signals from summing amplifier 610 are processed by a second ADC 620.

In the alternative embodiment of this invention shown in the schematic block diagram of FIG. 8, the number of customers served by the node 600 has been doubled by adding an additional RF summing amp, an additional an analog-to-digital converter, and additional digital summers to the basic node 315 of FIG. 6. The node 600 is also equipped with a status and control processor 640 that is designed to control the operation of key subassemblies at the node 600 in addition to sending operating data to the hub.

In the node 600, the signal from ADC 615 is summed, by summer 630, with a first data stream provided by the counterclockwise receiver 660, and the output of summer 630 is provided as a second data stream to the counterclockwise transmitter 655. The signal from ADC 615 is also summed, by summer 635, with a second data stream provided by the clockwise receiver 665, and the output of summer 635 is provided as a first data stream to the clockwise transmitter 670.

In similar manner, the signal from ADC 620 is summed, by summer 645, with a second data stream provided by the counterclockwise receiver 660, and the output of summer 645 is provided as a first data stream to the counterclockwise transmitter 655. The signal from ADC 620 is also summed, by summer 650, with a first data stream provided by the clockwise receiver 665, and the output of summer 650 is provided as a second data stream to the clockwise transmitter 670.

The counterclockwise transmitter 655 and the clockwise transmitter 670 each includes a two-to-one (2 →1) multiplexer for multiplexing the first and second received data streams into a single data stream that is then transmitted to additional nodes within the nodal ring. Each receiver 660, 665 receives a single data stream which is demultiplexed, by an internal one-to-two (1→2) multiplexing function, into two data streams that are provided to various summers, as described above.

Figure 9:
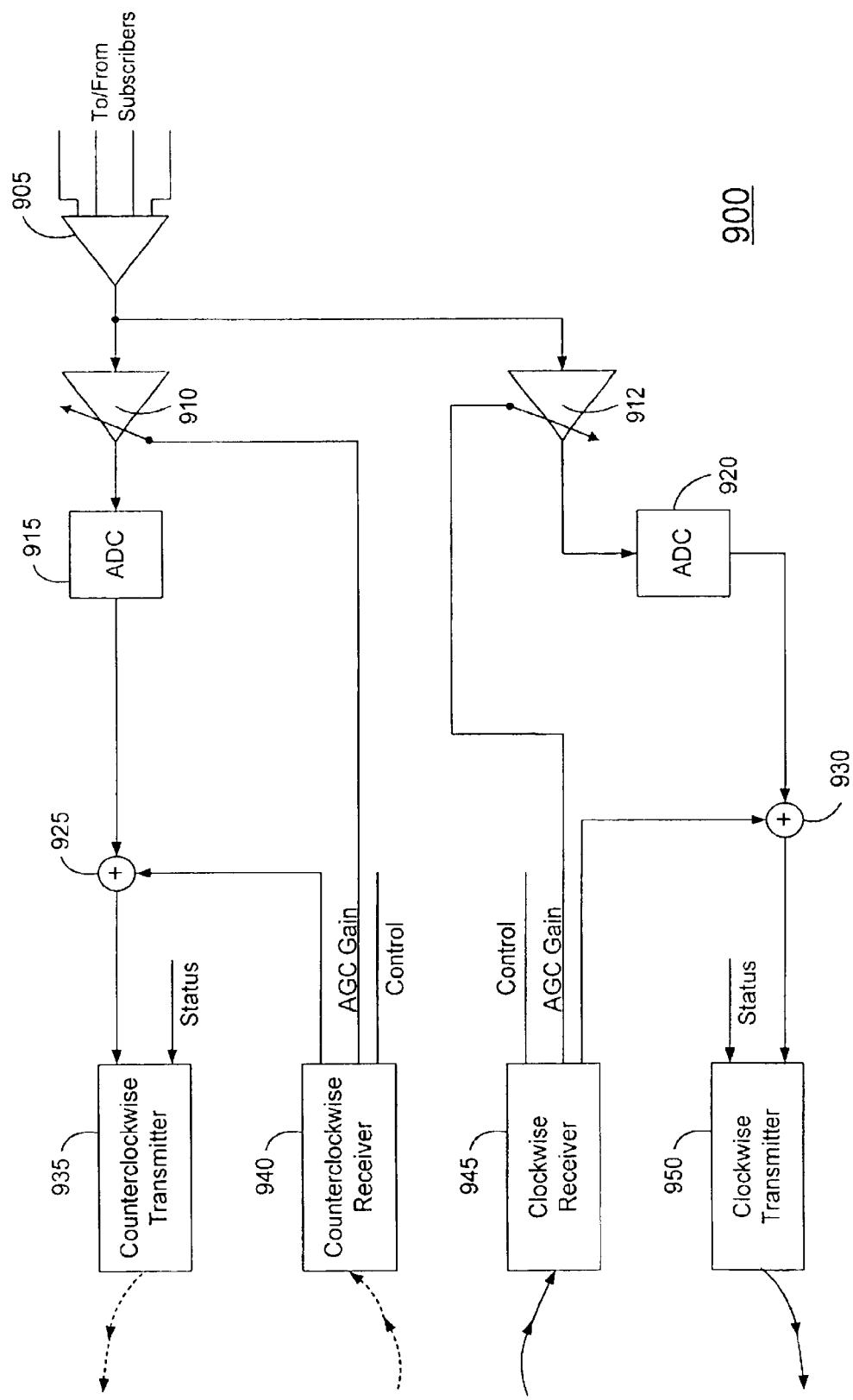
FIG. 9 is a block diagram of the component assemblies of a bidirectional fiber deep node incorporating a digital multiplexer and a variable RF amplifier for automatic gain control in accordance with the present invention.

Additionally, the receivers 660, 665 provide status information to the status processor 640, which outputs status signals for transmission by the transmitters 655, 670. In addition to expandability, noise control within the reverse plant of a fiber deep ring system is of prime importance. Individual, high-intensity noise sources can adversely affect the system by drowning out other RF inputs and increasing the overall signal power in the fiber optic ring. The optimal signal power may also be exceeded due to the cumulative contribution of several nodes within in the ring. Referring next to FIG. 9, an alternative embodiment of the present invention is shown as node 900. Node 900 advantageously minimizes these effects through the inclusion of variable gain amplifiers 910, 912 situated to receive the signal(s) provided by one or more RF summing amplifiers 905. and the analog-to-digital converters. Under the control of gain signals provided by a hub or an internal status processor (not shown), the variable gain amplifiers 910, 912 can amplify or attenuate the signals to reduce the effects of noise and to optimize the total signal power in the fiber optic ring.

The attenuated or amplified signals are then provided to analog-to-digital converters 915, 920.

The resulting digital signals are summed by summers 925, 930 with signals from the receivers 940, 945, and the summed signals are transmitted by the transmitters 935, 950.

While the embodiments described above detail key features, it should be realized that numerous other realizations are possible within the scope of this invention. For example, the direction of normal information flow (counterclockwise in the embodiments) may be chosen at discretion of the system designer. Furthermore, systems may be constructed in which some or all of the nodes are equipped with digital expansion multiplexers and/or variable RF amplifiers.

What is claimed is:

1. A communication system, comprising:

headend equipment for transmitting downstream signals and for processing upstream signals;

a hub coupled to the headend equipment for forwarding the downstream signals and for providing the upstream signals to the headend equipment, wherein the hub comprises:

a clockwise receiver for receiving clockwise-traveling signals, a counterclockwise receiver for receiving counterclockwise-traveling signals; and a data selector coupled to the counterclockwise receiver and the clockwise receiver for selecting one of the counterclockwise-traveling signals and the clockwise-traveling signals for transmission to the headend equipment;

a plurality of nodes coupled in a bi-directional nodal ring with the hub;

a clockwise communication path for coupling the plurality of nodes and the hub for the reception and transmission of the clockwise-traveling signals that include the downstream signals and at least a portion of the upstream signals;

a counterclockwise communication path for coupling the plurality of nodes and the hub for the reception and transmission of the counterclockwise-traveling signals that include the downstream signals and at least a portion of the upstream signals; and subscriber equipment coupled to the plurality of nodes for receiving the downstream signals and for generating the upstream signals, wherein, when a malfunction is detected in one of the counterclockwise communication path and the clockwise communication path, the other of the counterclockwise communication path and the clockwise communication path is employed to transmit the downstream signals to ones of the nodes that are no longer able to receive the downstream signals via the malfunctioning path.

2. The communication system of claim 1, wherein, when a malfunction is detected in one of the counterclockwise communication path and the clockwise communication path, the other of the counterclockwise communication path and the clockwise communication path is employed to transmit the upstream signals to ones of the nodes that are no longer able to transmit the upstream signals via the malfunctioning path.

3. The communication system of claim 2, wherein the downstream signals and the upstream signals provided over the counterclockwise communication path are processed by the subscriber equipment and the hub, respectively, unless the counterclockwise communication path malfunctions.

4. The communication system of claim 2, wherein each node comprises:

a counterclockwise receiver for receiving the counterclockwise-traveling signals transmitted over the counterclockwise communication path;

a clockwise receiver for receiving the clockwise-traveling signals transmitted over the clockwise communication path;

a counterclockwise transmitter for transmitting the counterclockwise-traveling signals over the counterclockwise communication path;

a clockwise transmitter for transmitting the clockwise-traveling signals over the clockwise communication path; and a status processor coupled to the counterclockwise and clockwise receivers and transmitters for determining whether one of the counterclockwise communication path and the clockwise communication path has malfunctioned, and, in response to detecting a malfunction, for generating a control signal indicative of the malfunction, wherein the control signal is transmitted by one of the counterclockwise transmitter and the clockwise transmitter over the functioning communication path.

5. The communication system of claim 4, wherein each node further comprises:

a summing amplifier for receiving the upstream signals from the subscriber equipment and generating a summed signal;

an analog-to-digital converter coupled to the summing amplifier for converting the summed signal into a digital signal; and a first digital summer coupled to the analog-to-digital converter and the counterclockwise receiver for summing the digital signal with counterclockwise data to generate a summed counterclockwise signal that is transmitted by the counterclockwise transmitter.

6. The communication system of claim 5, wherein each node further comprises a second digital summer coupled to the analog-to-digital converter and the clockwise receiver for summing the digital signal with clockwise data to generate a summed clockwise signal that is transmitted by the clockwise transmitter.

7. A broadband communication system, comprising:

headend equipment for transmitting downstream signals and for processing upstream signals;

communication devices coupled to one another in a bidirectional ring, wherein one of the communication devices functions as a hub that is coupled to the headend equipment for providing the upstream signals to, and receiving the downstream signals from, the headend equipment, wherein the hub comprises:

a clockwise receiver for receiving clockwise-traveling signals;

a counterclockwise receiver for receiving counterclockwise-traveling signals; and a data selector coupled to the clockwise receiver and the counterclockwise receiver for selecting one of the counterclockwise-traveling signals and the clockwise-traveling signals for transmission to the headend equipment;

a clockwise communication path for coupling the communication devices to one another for the reception and transmission of the clockwise-traveling signals that include the downstream signals and at least a portion of the upstream signals;

a counterclockwise communication path for coupling the communication devices to one another for the reception and transmission of the counterclockwise-traveling signals that include the downstream signals and at least a portion of the upstream signals; and subscriber equipment coupled to the communication devices for receiving the downstream signals and for generating the upstream signals, wherein, when a malfunction is detected in one of the counterclockwise communication path and the clockwise communication path, the other of the counterclockwise communication path and the clockwise communication path is employed to transmit the downstream signals to ones of the communication devices that are no longer able to receive the downstream signals via the malfunctioning path.

8. The broadband communication system of claim 7, wherein, when a malfunction is detected in one of the counterclokwise communication path and the clockwise communication path, the other of the counterclokwise communication path and the clockwise communication path is employed to transmit the upstream signals to the communication devices that are no longer able to transmit the upstream signals via the malfunctioning path.

9. The broadband communication system of claim 8, wherein the downstream signals and the upstream signals provided over the counterclockwise communication path are processed by the subscriber equipment and the hub, respectively, unless the counterclockwise communication path malfunctions.

10. The broadband communication system of claim 8, wherein the communication devices include nodes.

11. The broadband communication system of claim 10, wherein each node comprises:

a counterclockwise receiver for receiving the counterclockwise-traveling signals transmitted over the counterclockwise communication path;

a clockwise receiver for receiving the clockwise-traveling signals transmitted over the clockwise communication path;

a counterclockwise transmitter for transmitting the counterclockwise-traveling signals over the counterclockwise communication path;

a clockwise transmitter for transmitter the clockwise-traveling signals over the clockwise communication path; and a status processor coupled to the counterclockwise and clockwise receivers and transmitters for determining whether one of the counterclockwise communication path and the clockwise communication path has malfunctioned, and, in response to detecting a malfunction, for generating a control signal indicative of the malfunction, wherein the control signal is transmitted by one of the counterclockwise transmitter and the clockwise transmitter over the functioning communication path.

12. The broadband communication system of claim 11, wherein each node further comprises:

a summing amplifier for receiving the upstream signals from the subscriber equipment and generating a summed signal;

an analog-to-digital converter coupled to the summing amplifier for converting the summed signal into a digital signal; and a first digital summer coupled to the analog-to-digital converter and the counterclockwise receiver for summing the digital signal with counterclockwise data to generate a summed counterclockwise signal that is transmitted by the counterclockwise transmitter.

13. The broadband communication system of claim 12, wherein each node further comprises a second digital summer coupled to the analog-to-digital converter and the clockwise receiver for summing the digital signal with clockwise data to generate a summed clockwise signal that is transmitted by the clockwise transmitter.

* * * * *